(12) United States Patent
Bech

(10) Patent No.: US 8,778,479 B2
(45) Date of Patent: Jul. 15, 2014

(54) PRE-FORM AND METHOD OF PREPARING A PRE-FORM

(75) Inventor: Anton Bech, Ringkøbing (DK)

(73) Assignee: Vestas Wind Systems A/S, Aarhus N. (DK)

( * ) Notice: Subject to any disclaimer, the term of this patent is extended or adjusted under 35 U.S.C. 154(b) by 1343 days.

(21) Appl. No.: 10/547,749

(22) PCT Filed: Mar. 6, 2003

(86) PCT No.: PCT/EP03/02293
§ 371 (c)(1),
(2), (4) Date: Sep. 2, 2005

(87) PCT Pub. No.: WO2004/078443
PCT Pub. Date: Sep. 16, 2004

(65) Prior Publication Data
US 2006/0172636 A1    Aug. 3, 2006

(51) Int. Cl.
| | |
|---|---|
| D03D 9/00 | (2006.01) |
| B32B 5/12 | (2006.01) |
| B32B 25/10 | (2006.01) |
| B32B 27/04 | (2006.01) |
| B32B 27/12 | (2006.01) |

(52) U.S. Cl.
USPC ............... 428/113; 428/297.1; 428/297.4; 428/299.1; 442/1

(58) Field of Classification Search
USPC ......... 428/34.9, 292.1; 156/287, 79; 24/33 P; 55/320
See application file for complete search history.

(56) References Cited

U.S. PATENT DOCUMENTS 3,967,996 A  *  7/1976  Kamov et al. ................. 156/156
4,256,790 A  *  3/1981  Lackman et al. ............. 428/73
(Continued)

FOREIGN PATENT DOCUMENTS

DE    38 27 126    6/1989
DE    689 28 158   1/1998
(Continued)

OTHER PUBLICATIONS

R. Wachsmuth; Select pages from Aeolus II Report; pp. 77-128; May 1992; MBB Deutsche Aerospace.
(Continued)

*Primary Examiner* — Ellen S Raudenbush
*Assistant Examiner* — Anthony J Frost
(74) *Attorney, Agent, or Firm* — Wood, Herron & Evans, LLP

(57) ABSTRACT

A pre-form and a method of preparing pre-forms are provided. The pre-forms comprise a resin and at least two layers of oriented fiber tows. The pre-forms comprise fiber tows instead of the traditional prepregs to enhance rearranging of resin and/or fibers during subsequent processing as well as provide greater freedom, a price reduction and/or a reduction of waste. The pre-forms may be formed three-dimensionally to enhance coupling to further pre-forms or other structures and/or to enhance shaping of the pre-form to a final three-dimensional shape. The method of preparation of pre-forms involves providing an adhesive between layers of fibers and providing a resin in contact with at least one of the layers of fibers. The resin is preferably provided in a non-continuous layer to allow for removal of gas at least partially in a direction orthogonal to the layers of resin. The pre-forms are suitable for preparation of composite structures like for example spars for wind turbine blades.

20 Claims, 7 Drawing Sheets

(56) References Cited

U.S. PATENT DOCUMENTS

| | | | |
|---|---|---|---|
| 5,080,851 A | | 1/1992 | Flonc et al. |
| 5,085,928 A | | 2/1992 | Krueger |
| 5,163,962 A | * | 11/1992 | Salzstein et al. ............ 623/23.34 |
| 5,427,725 A | * | 6/1995 | White et al. ................... 264/137 |
| 6,096,669 A | | 8/2000 | Colegrove et al. |
| 6,139,942 A | * | 10/2000 | Hartness et al. ............ 428/298.1 |
| 2001/0031350 A1 | * | 10/2001 | Day et al. .................... 428/317.9 |
| 2003/0021976 A1 | * | 1/2003 | Dublineau et al. ......... 428/297.4 |
| 2004/0146696 A1 | | 7/2004 | Jones |

FOREIGN PATENT DOCUMENTS

| | | | |
|---|---|---|---|
| DE | 693 20 772 | | 4/1999 |
| DE | 198 09 264 | | 9/1999 |
| DE | 100 50 851 | | 4/2002 |
| EP | 0 033 244 | | 8/1981 |
| EP | 0 073 648 | | 3/1983 |
| EP | 0 361 796 | | 4/1990 |
| EP | 0 396 281 | | 11/1990 |
| EP | 0 475 883 | | 3/1992 |
| EP | 1 125 728 | | 8/2001 |
| EP | 1 145 841 | | 10/2001 |
| EP | 1 408 152 | | 4/2004 |
| FR | 2 794400 | | 12/2000 |
| WO | 97/37835 | | 10/1997 |
| WO | 98/34979 A1 | | 8/1998 |
| WO | WO-98/50211 | | 11/1998 |
| WO | WO/9850211 | * | 11/1998 |
| WO | 99/21697 | | 5/1999 |
| WO | WO 02/090089 | * | 11/2002 |
| WO | 03/004758 | | 1/2003 |

OTHER PUBLICATIONS

R. Wachsmuth; English translation of Rotor Blade of Composite Fiber Design for the Wind Power Installation; Aeolus II, Phase I & II; 21 pages; May 1992; Federal Ministry for Research and Technology.

Cheng-Huat Ong et al; Document entitled The Use of Carbon Fibers in Wind Turbine Blade Design: A Seri-8 Blade Example; Mar. 2000; 78 pages; Stanford, CA.

European Patent Office, Communication received in corresponding EP Application Serial No. 10010111.2-1253 dated May 18, 2012, 4 pages.

* cited by examiner

Fig. 5A
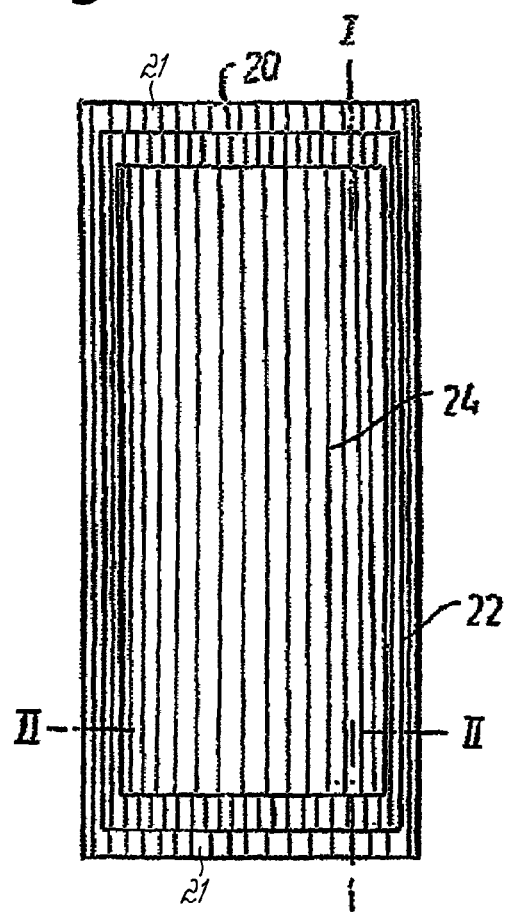
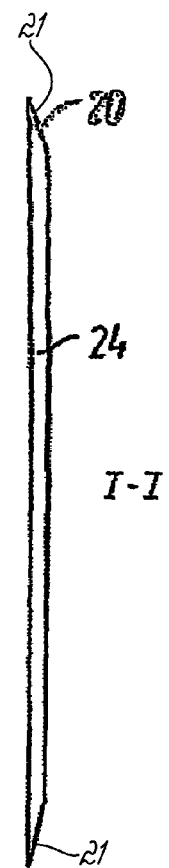
Fig. 5B
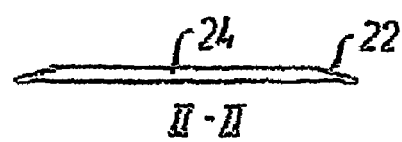
Fig. 5C

PRE-FORM AND METHOD OF PREPARING A PRE-FORM

TECHNICAL FIELD OF THE INVENTION

The invention relates to fibre-reinforced composites. In particular, the invention relates to a semi-manufacture comprising a resin and several layers of fibre tows.

BACKGROUND OF THE INVENTION

Pre-forms comprising resin and fibres are known in the prior art.

U.S. Pat. No. 6,139,942 discloses a pre-form with a stack of partially impregnated fabric and un-impregnated fabric. The layers of such a stack may slide before curing and may hence be difficult to handle. It is suggested to use cross-ply stitching to prevent this, however, this process is tedious and may introduce undesirable restrictions to the shape of the stack during curing.

EP-patent 0 475 883 also discloses a pre-form with a plurality of oriented fibre layers. However, the pre-form requires infusion of a resin to cure which may be time-consuming and to some extent prevent rearranging of the fibres and resin during curing.

WO 02/090089 discloses a moulding material having a ventilating structure in the otherwise continuous resin layers. The ventilating structure is designed to allow gas to be removed from the moulding material during processing in the plane of the resin and/or in the plane of the reinforcement material. As the ground plan of the moulding material increases, this will become a still less safe way to remove gas from the moulding material due to the increasing risk of plugging during processing.

Objects of the Invention

It is the object of the invention to provide a pre-form that may be used for manufacture of reinforced composites and which poses good reproducibility, low porosity and good physical properties.

It is another object of the invention to provide a method for pre-consolidating a pre-form involving a partial curing of a resin.

It is a further object of the invention to provide a pre-form and a method of production of a pre-form that are adaptable to automated processing.

Disclosure of the Invention

The above and more objects are realised by the invention as described and explained in the figures, preferred embodiments and claims.

A pre-form is a composite material comprising fibres and—unless otherwise stated—an uncured resin. The fibres are preferably provided in layers of oriented fibres like for example individual fibres, fibre tows, fibre tow-pregs or prepregs. Individual fibres, fibre tows and fibre tow-pregs are advantageous over prepregs, since the individual fibres are less bounded and hence may rearrange easier during subsequent processing. Furthermore, individual fibres, fibre tows and tow-pregs are advantageous over prepregs in that they may be provided in the pre-form with a greater freedom, the price is lower as well as the amount of waste may be lower. The invention provides a pre-form comprising a resin and at least two layers of oriented fibre tows, however, the advantage of using a pre-form or a method according to the present invention will increase as the number of layers of oriented fibre tows are increased. Hence, the pre-form preferably comprises at least three layers of oriented fibre tows. A higher number of layers like e.g. 4, 5, 8, 10, 15, 20, 50, 100 or more layers may be used within the scope of the invention.

Besides fibres and resin, a pre-form according to the invention may for example contain one or more of fillers (e.g. a cheap inert material) and/or solvents and/or diluents and/or rheological agents and/or viscosity adjusting agent.

The layers of oriented fibres are fibre tows or tow-pregs contrary to pre-pregs, since this provides a higher degree of freedom of design and will allow for a lower viscosity and mobility of fibres during subsequent processing of a pre-form, e.g. pre-consolidation or curing. Furthermore, pre-forms prepared from individual fibres, fibre tows and tow-pregs are advantageous over pre-forms prepared from prepregs in that the cost of production is lower as well as the amount of waste is typically lower. Fibre tows are bundles of a large number of individual fibres, e.g. 1,000's, 10,000's or 100,000's of fibres. Tow-pregs are at least partially impregnated fibre tows.

It may be theorized that the strength of a composite depends amongst others on the strength of the interface between the fibres and the matrix material (i.e. the cured resin). As the stiffness of the fibre is increased, the sensitivity to the strength of the interface is also increased. Presence of porosity may weaken the interface but the actual effect of the porosity depends for example on the positioning and the size of the pores. Generally speaking, the greater the pores and the greater the amount of pores, the worse. Another aspect is the wetting of the fibres. The difficulty in getting a good vetting of the fibres increases as the fibre diameter is decreased. The processes and products of the present invention are particularly advantageous for pre-forms comprising thin and stiff fibres like for example carbon fibres, however, these processes and products are also superior to the prior art when other types of fibres are used as reinforcement like for example glass fibres, aramid fibres, synthetic fibres (e.g. acrylic, polyester, PAN, PET, PE, PP or PBO-fibres), bio fibres (e.g. hemp, jute, cellulose fibres etc.), mineral fibres (e.g. ROCKWOOL®), metal fibres (e.g. steel, aluminum, brass, copper, etc.) or boron fibres.

Traditionally, gas enclosed in the pre-form prior to and during curing has traditionally been removed in the direction of the fibres, i.e. in the plane of a resin layer. Hence, the larger the structure, the longer the gas has to travel to be released from the structure. The risk that gas becomes trapped inside a cured structure is hence increased with the size of the structure. It appears that the problem with entrapped gas is particularly pronounced when the reinforcement is unidirectional fibres. It may be speculated that this is due to the very close packing of the fibres, which may arise in some areas of a composite reinforced by unidirectional fibres. However, problems concerning entrapped gas may also be present in other types of fibre orientations e.g. biaxial or random orientations and the inventive idea of the present invention is hence advantageous for any type of fibre orientation even if the advantage is greatest when using a unidirectional fibre orientation.

By gas is herein meant entrapped atmospheric air as well as gaseous products, by-products and starting materials related to the preparation process.

The fibres may be a mixture of more than one type of fibres. For example a combination of glass fibres and carbon fibres may be used, but any combination of two or more of the fibre types mentioned herein are feasible. The mixture may be homogeneous, with different concentrations in separate fibre layers or with different concentrations of fibres within any fibre layer. Mixing of fibres may be advantageous, since this opens for tailoring of material properties, for example from a combined stress/cost-perspective, or parts of a pre-form particularly suitable for connecting to other materials may be provided. However, in a preferred embodiment, the fibres are primarily or exclusively carbon fibres.

By carbon fibres is hereinafter meant fibres where the main component is carbon. Hence, by this definition carbon fibres comprise fibres with graphite, amorphous carbon or carbon nano-tubes. Thus, carbon fibres produced via for example a polyacrylonitril-route and a pitch-based route are comprised by this definition.

By fibres are hereinafter meant particles having an aspect ratio (length/equivalent diameter) of more than 10. By equivalent diameter is meant the diameter of a circle having the same area as the cross sectional area of the particle. However, in a preferred embodiment, the fibres are continuous fibres, i.e. fibres that substantially run from one edge of a pre-form to another.

The resin may be a thermoplastic or a thermosetting resin, however it is preferred to use a thermosetting resin for reasons of chemical and thermal stability as well as ease of processing. It is further preferred that the resin is an epoxy-based or a polyester-based resin, most preferably an epoxy-based resin. The resin may comprise more than one resin system. It may be advantageous to use more than one resin system to be able to optimise the properties of the resin for the subsequent steps of processing, for example with respect to viscosity and timing/controlling of the curing process. These systems may or may not be based on the same type of resin, however, it is preferred that such systems are based on the same type of resin like for example two or more epoxy-based systems. In another preferred embodiment, the resin types differ but the resins are compatible.

The method according to the invention is adapted to automated processing. For example, the layers of oriented fibre tows, the adhesive and the resin may advantageously be distributed by a robot. The automation is facilitated by an at least partial immobilisation of fibres by an adhesive, which will prevent or at least greatly reduce disturbance in the layers of oriented fibre tows. When the adhesive is only applied to selected areas of the ground plan of the pre-form, time is furthermore saved compared to distribution of resin over the entire ground plan.

Resin systems may contain components, which may be irritant or harmful when in contact with naked skin, if ingested or inhaled. Avoidance of direct contact is therefore highly desirable. Since the products and processes according to the invention are particularly well suited for automation, the products and processes according to the invention represent a significant improvement to the working environment.

BRIEF DESCRIPTION OF THE DRAWINGS

FIG. 5A is a plan view of a pre-form with tapered parts, FIG. 5B is a cross-sectional view of the pre-form taken along line I-I in FIG. 5A, and FIG. 5C is a cross-sectional view of the pre-form taken along line II-II in FIG. 5A.

DESCRIPTION OF THE DRAWINGS

Figure 1:
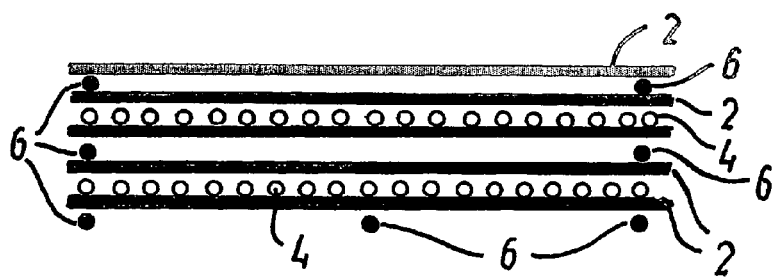
FIG. 1 shows a schematic cross sectional view of a pre-form.

In FIG. 1 an example of a schematic sectional view of a pre-form is shown indicating an example of the order of the components. In a real pre-form, the distance between the layers would be much smaller and the resin and adhesive would usually be partially absorbed into the layers of fibres. Layers of oriented fibre 2 are provided with strips of adhesive 6 (see FIG. 4) at an angle—here about orthogonal—to the layers of oriented fibre tows 2. Two layers of resin 4 are also provided. The resin 4 is distributed as a number of lines (see FIG. 3) at an angle—here about orthogonal—to the layers of oriented fibre tows 2. The resin hence is distributed in a non-continuous layer to allow for gas to escape from the pre-form orthogonal to the direction of the fibre tows.

In FIG. 1 the resin is provided between two layers of fibre tows. This is the preferred positioning of resin and when this positioning is used, it is highly desirable that the resin is distributed in non-continuous layers. However, the resin may also be provided in contact with only one layer of fibre tows, i.e. in the top or at the bottom of the pre-form. In this case, it is preferred to provide the resin at the bottom of the pre-form and the resin may be provided in a continuous layer as gas will not usually have to escape through the resin layer. In a preferred embodiment, resin is only provided at top and/or the bottom of the pre-form, i.e. only adhesive is provided between the layers of fibres. In another preferred embodiment, resin is only provided at the bottom of the pre-form, i.e. between the layers of fibres only adhesive is provided.

The adhesive 6 should at least partially immobilise the fibres that are provided on top of the adhesive. The adhesive may be any type of adhesive, however, the adhesive should be compatible to the resin, preferably the adhesive is a resin-type adhesive and related to the resin of the pre-form in the sense that it comprises the same type of chemistry. For example, the adhesive may comprise at least one of the components of the resin (e.g. a common epoxy component). One way to ensure compatibility between the resin and the adhesive is to use substantially the same composition. In a preferred embodiment, the composition of the adhesive is the same as the composition of the adhesive. It is within the scope of the invention to use more than one adhesive in a pre-form. For example some portions of adhesive may have the same composition as the resin, whereas other portions may have a different composition.

Examples of preferred embodiments of geometrical ground plans 10 of pre-forms are shown in FIG. 2. The lines 2 indicate the main fibre orientation(s) of a fibre layer. Each layer of fibres typically comprises a large number (e.g. multiple millions) of fibres oriented in the main and optionally further orientations. A person skilled in the art will be able to derive a number of other geometrical ground plans without deriving from the inventive idea of the invention. FIG. 2A shows a rectangular pre-form, which may be particularly suitable for flat or cylindrical structures. FIG. 2B-FIG. 2F show pre-forms with substantially trapezoid ground plans. The angles α and β may be the same or different, however, it is preferred that these angles are substantially the same, since the pre-form may then be used for production of for example conical structures.

The ratio of the distance between the parallel sides and the length of any of the parallel sides is preferably at least 3 and more preferably at least 5, since such pre-forms are particularly useful for production of long, slightly conical structures like spars for wind turbine blades. The ground plan in FIG. 2F has a ratio of about 6.

Figure 2A:
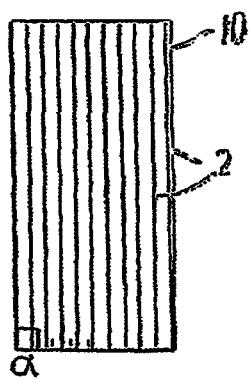
FIG. 2 shows a schematic view of preferred geometrical ground plans and fibre orientations in a pre-form.
Figure 2B:
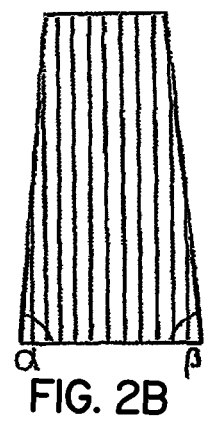
Figure 2C:
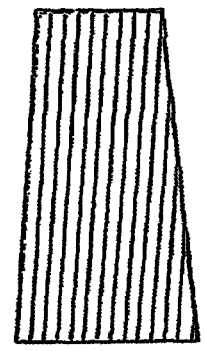
Figure 2D:
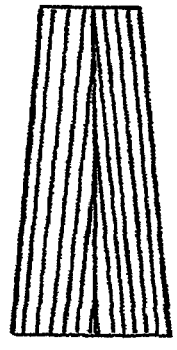
Figure 2E:
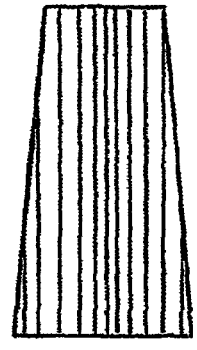
Figure 2F:
Figure 2G:
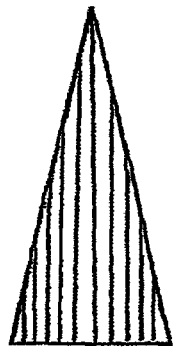
Figure 2H:
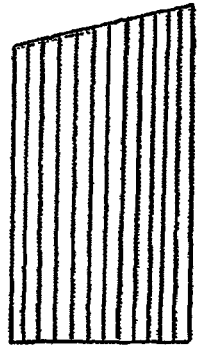

FIG. 2G shows a pre-form with a triangular ground plan. Again, it is preferred that the angles α and β are substantially the same. Such a pre-form may be particularly useful for reinforcing a structure with a relatively sharp corner. The pre-form in FIG. 2H has a more irregular quadrangular ground plan. Such quadrangular ground plans may or may not have one or two angles of 90°.

Figure 2I:
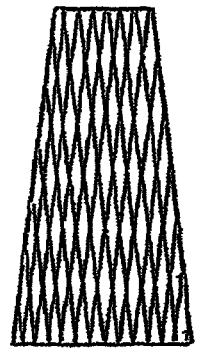
Figure 2J:
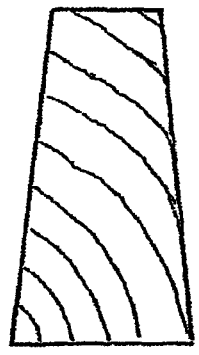

In FIG. 2I is an example of a layer having two main fibre orientations. Here, the fibres are mainly oriented parallel to the longer edges, however, other orientations are feasible as well as more than two main orientations. FIG. 2J shows an example of a layer having non-straight fibres. The fibres are preferably oriented to optimise the final structure—after shaping and curing—with respect to strength and/or other properties.

The fibres 2 may be provided in any desirable orientation like for example unidirectional, biaxial or random. However, the fibres should be oriented as to strengthen areas of the final structure, which will be exposed to a higher stress during service. Typically, this may be realised by orienting the fibres primarily unidirectionally and either substantially parallel to or orthogonal to an edge of the pre-form. In FIG. 2A, C, D, H and I the fibres are placed substantially parallel to at least one edge of the pre-form and in FIGS. 2A, B, E, F, G and H the fibre tows are placed substantially orthogonal to at least one edge of the pre-form. If the ground plan has two parallel sides and the ratio of the distance between the parallel sides and the length of any of the parallel sides is very large, i.e. >5, then unidirectional fibres placed between the two parallel sides may be considered to be substantially parallel to the longer edges (see e.g. FIG. 2F). Other ways of orientating the fibres may be derived by a person skilled in the art without departing from the inventive idea of the invention.

The orientation of fibres may or may not be the same in all the layers of fibres; however, in a preferred embodiment the fibres are oriented substantially the same in all the layers of fibres. When one or more layers of fibres are oriented in another way as other layers, this may for example be if the stress analysis suggests a multi-axial fibre placing, but unidirectional fibre placing is favourable for manufacturing reasons.

Another way to strengthen the area of the final structure, which will be exposed to higher stress during service, is to increase the amount of fibres in these areas. An example of this is shown in FIG. 2E, where the area near the central part of the pre-form has a greater amount of fibre tows than the outer parts of the pre-form.

Figure 3A:
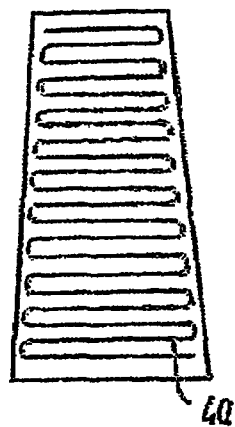
FIG. 3 shows a schematic view of preferred configurations of a resin layer.
Figure 3B:
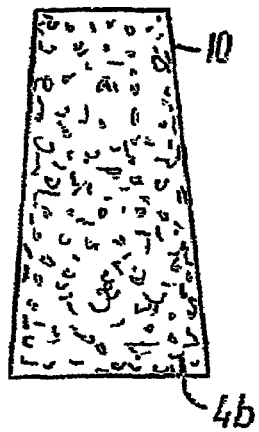
Figure 3C:
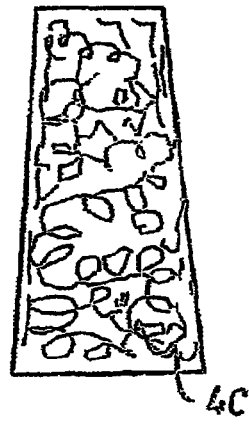
Figure 3D:
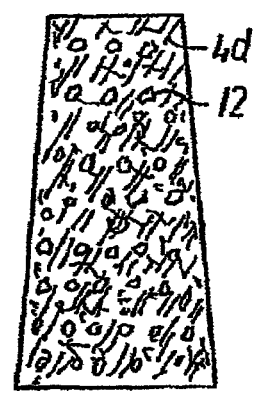

It is preferred that the resin is provided to form a non-continuous layer or layers, even if this is not a requirement for layers of resin where gas will not escape through during a subsequent consolidation and/or curing of the pre-form. The resin is preferably semi-solid and may stick to and/or at least partially immobilise fibres of one or more layers. In a preferred embodiment, the resin is distributed to form a pattern of solid or semisolid particles 4b, these particles may for example be sprinkled over a layer of fibres as shown in FIG. 3B. The discrete dots may alternatively for example be formed from a resin provided as a liquid. A liquid resin may also be provided as a line or several lines, which maybe form an oriented pattern, a random pattern or a combined pattern. An example of an oriented pattern is shown in FIG. 3A, where a resin is distributed as lines of resin 4a orthogonal to a main fibre orientation. As a variation to the distribution shown in FIG. 3A, the resin may be provided partially over the edge, i.e. the turning part of the string may be off the ground plan to provide for a more even density of resin. However, this will result in an undesired waste and should be omitted for example by controlling the flow of the resin during the applying. An example of a random pattern is shown in FIG. 3C, where a resin is distributed as curly lines. A different approach to a non-continuous layer of resin is shown in FIG. 3D where a sheet of resin 4d having a number of through-going holes 12 are provided. As it is obvious from these examples of resin patterns, a person skilled in the art will be able to provide other patterns without departing from the inventive idea of the invention.

Figure 4A:
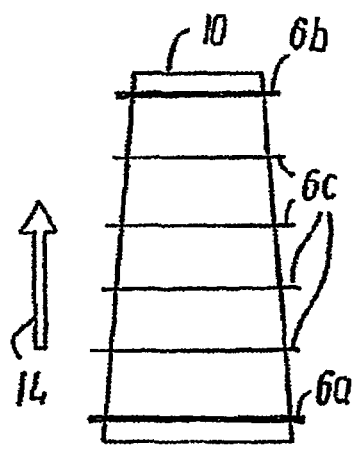
FIG. 4 shows a schematic view of preferred configurations of an adhesive.
Figure 4B:
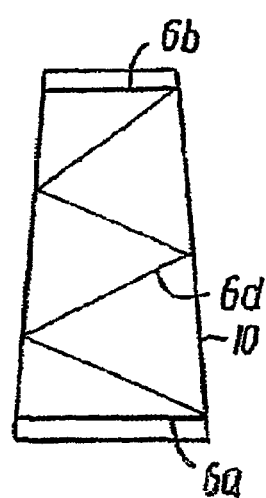

The adhesive 6 may in principle be provided in the same patterns as the resin, however, it is preferred to provide a less dense pattern for the adhesive to save time. In FIG. 4 some preferred embodiments of the adhesive distribution are shown. It is important to keep in mind that the purpose of the adhesive is to ensure that the fibres are at least partially immobilised to facilitate fibre laying. Furthermore, the adhesive will often increase the mechanical strength and hence the handleability of an unconsolidated and uncured pre-form by at least partially fixing adjacent layers of fibre to each other. One way to ensure a facilitation of the fibre laying is to provide a strip of adhesive close to or exactly where the fibres are initiated during fibre laying. In FIG. 4A the direction of the fibre laying is indicated by the arrow 14. Hence, the fibres are initiated near the adhesive 6a. A preferred way to ensure a relatively good fixation of the fibres is to provide adhesive 6b near the termination of the fibres. If the adhesive 6a and 6b does not provide sufficient fixation of the fibres, further adhesive 6c may be provided. In FIG. 4A the adhesive is provided as strips, however, other embodiments are also feasible like for example dots, broken or curved lines, etc. In some cases, automation may favour an adhesive pattern, where the adhesive is applied in a continuous line, for example as a zigzag pattern as shown in FIG. 4B. This is an example of a pattern where the number of adhesive initiations and terminations are reduced compared to the pattern in FIG. 4A. A person skilled in the art will appreciate the advantage of providing only a limited amount of adhesive compared to either a full or nearly full layer of resin or cross-ply stitching, particularly with respect to the time saved during processing and ease of automation.

In some applications, the pre-form is intended for reinforcing structures with a non-circular cross section like for example a spar having a substantially rectangular cross section where the pre-form should be bent around a relatively sharp edge. The preferred orientation of fibres in such case is that the main fibre orientation is parallel to the edge, e.g. in the direction I-I in FIG. 5. It may then be advantageous to form at least part of the pre-form three-dimensionally to enhance shaping of the pre-form. To realise a significant outcome of a three-dimensional forming, the pre-form usually should preferably comprise at least three layers of oriented fibre tows, since if the pre-form consists of only two layers, the pre-form may usually be bent without three-dimensional shaping of the pre-form. The higher the number of layers, the greater the benefit from three-dimensionally forming of the pre-form. In a preferred embodiment, a pre-form is provided with two tapered sections 22 towards the edges substantially parallel to the fibre orientation as indicated in FIG. 5; however, a person skilled in the art may derive a number of variations without deriving from the inventive idea of the invention. Such variations may for example be using one, three or another number of tapered parts, using one or more steps instead of tapered parts, placing a tapered part away from an edge e.g. near the centre etc.

By being formed three-dimensionally is herein meant that the thickness (e.g. the number of layers or amount of fibres and/or resin) and/or the form of the ground plan is adjusted for a part (e.g. 20, 22) of the pre-form relative to the bulk (e.g. 24) of the pre-form.

Three-dimensional forming may also be applied for reducing of the interfacial stress between a pre-form and an adjacent structure. Examples of such adjacent structures are other pre-forms and parts of larger structures, e.g. a root of a blade for a wind turbine. Typically, such three-dimensional forms will involve the creation of a large contact area orthogonal to the main stress direction in at least one axis. In FIG. 5A a part 20 is an example of a three-dimensional form for reducing the interfacial stress between the pre-form and an adjacent connected structure. A distance much greater than the orthogonal distance separates the terminations of the layers of fibres in the tapered section 20 (these terminations of the layers of fibres defining a connection surface 21 at the tapered section 20 for connecting to adjacent structure)as seen in the cross section along I-I in FIG. 5B and hence the interfacial stress will be reduced at the connection surface 21.

A particular ground plan or three-dimensional form may for example be realised by selective initiating and/or terminating fibre tows during fibre laying.

The main function of the adhesive is to immobilise the fibres as they are placed on top of the adhesive. This can be achieved by having a tacky adhesive, whereby the fibres stick to the tacky adhesive. The adhesive may be any tacky material, or a solid with a tacky surface and the adhesive may for example comprise polyester, polyurethane, epoxy or similar compounds or a combination of these. It is within the scope of the invention to use any material or combination of materials having a tacky surface including solid materials with tacky surfaces. More than one type of adhesive may be used within a pre-form. For example, it is within the scope of the invention to use the resin as an adhesive between the layers of fibre tows where a resin is provided or to use a second type of resin below the first layer of fibre tows.

The resin may be liquid, semisolid or solid material. The resin may for example be based on unsaturated polyester, polyurethane, epoxy, thermoplastics or similar chemical compounds, including combinations of these.

In a preferred embodiment of the invention, the resin is a liquid and the resin is introduced by Resin Transfer Moulding, RTM, or Vacuum Assisted Resin Transfer Moulding, VARTM, into an entity comprising several layers of oriented fibre tows, which were previously immobilised during fibre laying by an adhesive.

In another preferred embodiment, the resin is a solid. An entity comprising several layers of oriented fibre tows, which were previously immobilised during fibre laying by an adhesive, and a solid resin system is heated under vacuum in order to prepare a pre-consolidated pre-form.

In a further preferred embodiment, the resin is a semisolid and functions both as resin and as adhesive, i.e. during fibre laying, the resin will immobilise the fibres and during subsequent processing, it functions as a matrix material.

The resin may comprise more than one system, for example the resin may comprise two systems or even more systems. These systems may be any combination of different or the same type of systems, however, it is preferred that the resin comprises two substantially epoxy-based systems. In a preferred embodiment, two epoxy-based systems comprise a common component. The common component may for example be a common catalyst, a common amine component or a common epoxy component, however, it is preferred that the common component is an epoxy component. A resin comprising two epoxy-based systems with a common epoxy component may comprise an amine-component of a first epoxy-based system that will react to the common epoxy component at a first relatively low temperature, like for example below 50° C., preferably about room temperature. At this first temperature, a second epoxy-based system is preferably non-reactive or the reaction takes place at a very low rate. Since the reaction rate of the second epoxy-based system should be very low, it may advantageously be catalysed by a catalyst, which is non-active until activated. This activation may for example be by UV-light, addition of a compound or by heating, however, it is preferred that the catalyst is activated by heating.

Figure 6:
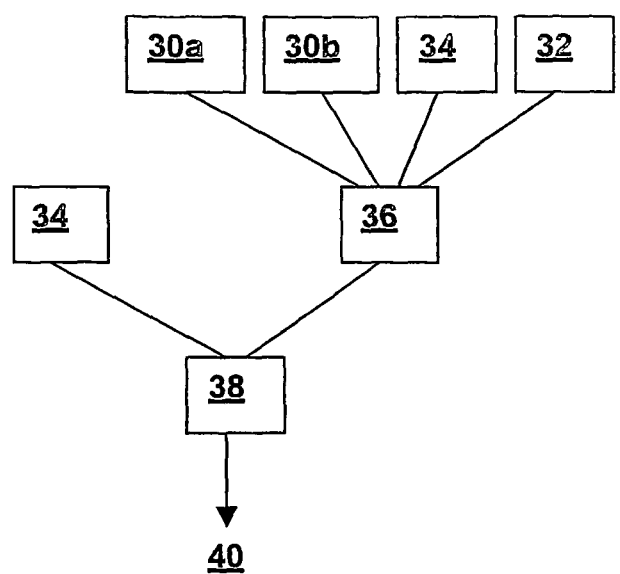
FIG. 6 shows a schematic view of a preferred method of preparing a resin.

In one embodiment sketched in FIG. 6, a pre-mix 36 comprises amine components 30a and 30b and a catalyst 32, preferably for catalysing the curing of a second epoxy-based system. The pre-mix should be a stable solution or slurry and if the viscosity is too low to prevent precipitation of a solid component like e.g. a catalyst, a small amount of an epoxy component, preferably a common epoxy component of the systems, may be added. Typically 0.1 to 5% by weight of epoxy should be sufficient to adjust the viscosity. The pre-mix and a common epoxy component should be mixed immediately before distribution of the resin 40. The resin may be heated to decrease the viscosity, but preferably the resin is semisolid at room temperature.

Resins to be used according to the present invention may be prepared in most of the traditional ways familiar to a person skilled in the art and the embodiment with regard to preparation of the resin that is disclosed in FIG. 6 should be considered as an example on how a resin may be prepared. This embodiment should by no means be regarded as a limitation of the scope of the invention.

Figure 7:
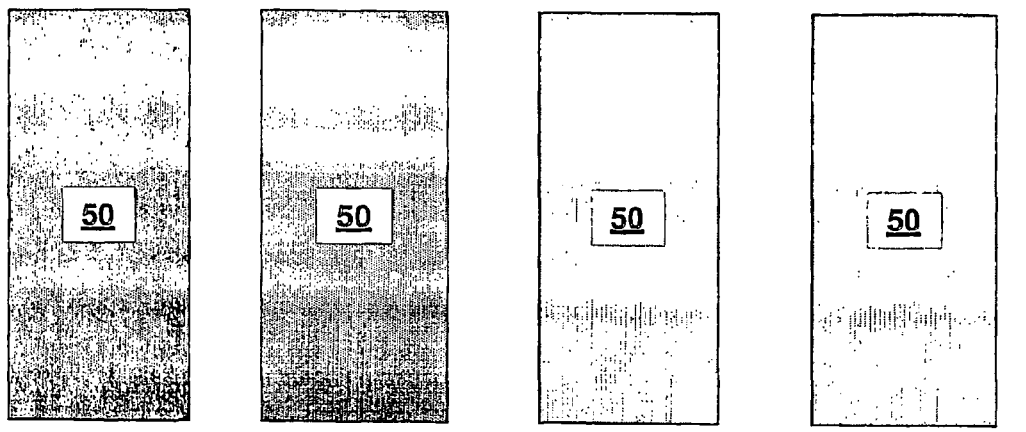
FIG. 7 shows an example of a pre-form having tapered parts prepared from fibre layers having substantially the same size.
Figure 7:
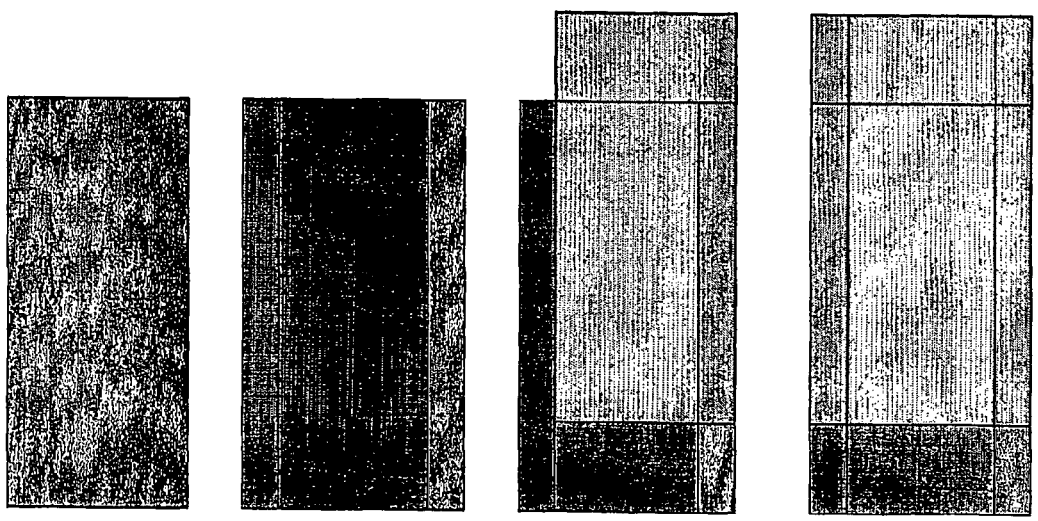
Figure 7:
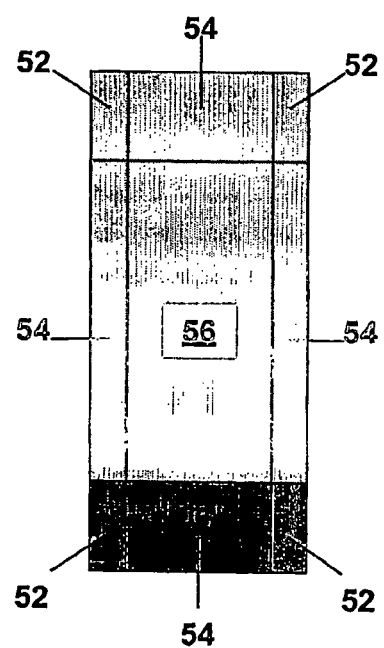

Alternatively, a simple three-dimensional shape may be provided as shown in FIG. 7, where a number of identical ground plans of oriented fibres 50 are placed on top of each other but shifted slightly. The lines shown on the ground plans 50 do not indicate the orientation of the fibre tows but are merely included to enhance distinguishing the different layers when they are combined. In the middle section of FIG. 7, the layers are placed on top of each other step by step and hence forming a pre-form in the bottom part of FIG. 7 having parts 52 with a low number of layers of fibres, parts 54 with an intermediate number of layers of fibres and a part 56 with a high number of layers of fibres. When a higher number of layers are provided, then the parts 52 and 54 may be prepared to appear almost taper-like. This method may simultaneously provide a pre-form having two, three, four or more tapered parts.

The properties of a fibre-reinforced composite depend to a large extent on the properties of the fibre. However, the properties of different types of fibres vary considerably. For example, the coefficient of thermal expansion of carbon fibres is very low, and in some cases even negative. It may therefore be very difficult to connect carbon fibre-reinforced composites to composites reinforced by other types of fibres and a pre-form comprising carbon fibres may therefore advantageously be enhanced for coupling to a composite member comprising a second type fibres and a resin. Examples of second type fibres are glass fibres, aramid fibres, synthetic fibres (e.g. acrylic, polyester, PAN, PET, PE, PP or PBO fibres), bio fibres (e.g. hemp, jute, cellulose fibres, etc.), mineral fibres (e.g. ROCKWOOL®), metal fibres (e.g. steel, aluminum, brass, copper etc.) or boron fibres.

In a preferred embodiment, the pre-form is enhanced for connecting by providing the pre-form with second type fibres. These second type fibres should extend beyond the pre-form to provide a part for connection. The second type fibres as well as the carbon fibres may be provided in interlaced layers rich in the respective fibres. For example, the layers may exclusively have only one of the type of fibres. In a preferred embodiment, the layers comprising second type fibres are provided as prepregs. The prepregs may be unidirectional prepregs, however, experimental results suggest, surprisingly, that biaxial prepregs comprising the second type fibres provide a better basis for connecting of the pre-form to a structure reinforced by second type fibres.

Near the end of a layer of fibres interlaced in a material having different properties, a stress concentration will build up. To reduce or prevent coupling of stress from the ends of one layer to the ends of the next layer, the distance of the interlace should be greater that the extent of the stress concentration. Since the extent of the stress concentration is difficult to establish, it is preferred to use a safety margin and hence separate the ends of two adjacent layers by at least 2 times the extent of the stress concentration.

It is also reasonable to ensure that the distance between the nearest layer end of the same type of fibre should be separated by a distance corresponding to the extent of a stress concentration, preferably with a safety margin and hence using a factor of 2.

The extent of the stress concentration depends on a number of factors, like for example thickness of the layers, the type of fibres, the type of resin, etc., and may be established by modelling or by empirical methods.

Pre-forms according to the invention and provided by a method according to the invention are very useful for pre-consolidation, since the escape of gas from the pre-form is facilitated by the presence of non-continuous layers of resin. The pre-forms may alternatively be used directly for preparation of composite members by curing. Particularly, the pre-forms are highly useful for preparation of members for wind turbine blades, since composites fulfilling the quality requirements and reproducibility requirements may be produced.

When larger structures comprising pre-forms according to the invention or pre-forms produced by a method according to the invention are to be prepared, this may follow a method wherein the pre-form is shaped at least partially plastically. The pre-form may be connected to further pre-forms before or after shaping to provide a larger structure. The pre-form may also be connected to other structures. It is preferred but not required that the connections involve a tapered part or layers comprising second type fibres. The combined structure may be placed in a vacuum enclosure and provided with vacuum prior to curing. Finally, the pre-form structure is cured.

Figure 8:
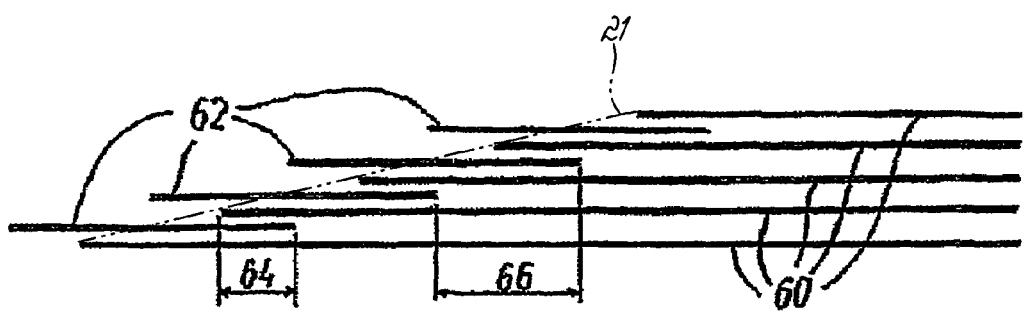
FIG. 8 shows an example of a pre-form enhanced for coupling of two composite members comprising two different types of reinforcement fibres.

FIG. 8 shows an example of a cross section of a pre-form that is enhanced for connection to a structure or other pre-forms being reinforced by a second type fibres. More thorough connections are particularly important when the physical properties of the structures to be connected differ significantly. Typically, the physical properties are to a high extent dictated by the reinforcement fibres, and examples of relevant physical properties are the coefficient of thermal expansion, CTE, and Young's modulus. Hence, these types of connections are for example relevant when a composite comprising carbon fibres are connected to a composite reinforced by another type of fibres, since the CTE of carbon fibres are very low and may even be negative. However, the same type of connections may be used for strong connections between composites reinforced by other types of fibres. The second type fibres may be any of the fibre-types mentioned previously in the description and for example this type of connection may be used for connecting a carbon fibre-reinforced composite to a glass fibre-reinforced composite. The pre-form in FIG. 8 has layers of second type fibres 62 (e.g., glass fibres) interlaced between the layers of carbon fibres 60 of the bulk pre-form. As described above, these second type fibres 62 extend beyond the pre-form (e,g., beyond the connection surface 21) for connection with the other structure to be coupled to the pre-form.

In a preferred embodiment, the overlay distance of the interlace 64 is greater than the extent of the end condition of the interfacial stress between layers rich in or exclusively containing carbon fibres and layers rich in or exclusively containing second type fibres, since this will prevent a coupling or build-up of stress between the interlaced layers. For the same reason and for reason of introducing a safety margin, it is more preferred that the distance of the interlace 64 is greater than 2 times the extent of the end condition of the interfacial stress.

In another preferred embodiment, the distance 66 between the ends of the layers rich in second type fibres which are interlaced between layers rich in carbon fibres, are separated by a distance greater than the extent of the end condition of the interfacial stress between layers rich in carbon fibres and layers rich in second type fibres. Again, this is to prevent a coupling or build-up of stress between the interlaced layers. For the same reason and for reason of introducing a safety margin, it is more preferred that the distance between the ends of the layers rich in second type fibres is greater than 2 times the extent of the end condition of the interfacial stress.

In a preferred embodiment, the pre-form is further treated by pre-consolidation to form a pre-consolidated pre-form as described in the following section. Pre-consolidation is particularly useful when the fibres are provided as individual fibres, fibre tows, fibre tow-pregs compared to fibres provided in prepregs as a lower viscosity during the pre-consolidation process. This will increase the redistribution of resin and/or fibres, which is highly desirable as it increases the homogeneity of the resulting product.

By pre-consolidation is herein meant a process, whereby gas inside a pre-form is removed and a low porosity pre-form is produced. Pre-consolidation involves redistribution of a resin and optionally a redistribution of fibres. Furthermore, pre-consolidation may involve a limited curing of the resin. Pre-consolidation is particularly useful as it produces a dense pre-form (hereinafter named a pre-consolidated pre-form). Pre-consolidated pre-forms and composites prepared from pre-consolidated pre-forms will be appreciated amongst others due to good reproducibility, low porosity, high homogeneity, high strength, ability to plastical shaping of the pre-consolidated pre-form, ability to be connected to other pre-forms and/or other structures, suitability for automation and long shelf life without premature curing.

When the pre-consolidation involves a limited curing, this limited curing may involve a release of up to 50% or the energy that will be released by a complete curing of the resin. However, it is preferred that the extent of curing is limited to an extent that will allow the pre-form to be deformed plastically. The degree of curing that will allow for plastical deformation of a pre-consolidated pre-form depends amongst others on the exact resin as well as on the fibre type and fibre content. Generally, it is preferred that the limited curing involves less than about 20% of the energy that will be released by a complete curing of the resin and more preferably that the limited curing involves between 3 to 15% of the energy that will be released by a complete curing.

Generally speaking, the pre-consolidation process should reduce the porosity of a pre-form, however, it is preferred that the resulting porosity of the pre-consolidated pre-form is less than 5% by volume, preferably less than 2% by volume and more preferably less than 1% by volume. In some cases, a porosity of even 1% may reduce the properties of a composite considerably. In these cases, it will be appreciated that the method and the pre-consolidated pre-forms may be produced with porosities well below 1%. For example, a reproduced porosity of about 0.2% by volume was realised for a composite with 60% carbon fibres in epoxy. The reduction of the porosity may for example be a result of exposing the pre-form to a pressure and/or a vacuum in relation to the pre-consolidation process.

The porosity of the pre-consolidated pre-form can not be established directly, as a density is not known and may vary throughout the material. Hence, the porosity should be established by optical method on a materialographic sample. Preparation of materialographic samples from an uncured pre-consolidated pre-form is very demanding, since the material comprises both a very soft element (i.e. a resin) and a very hard element (i.e. the fibre). To establish a reproducible result, it is hence necessary to cure the pre-form prior to materialographic preparation. This curing should be pressureless to ensure that the porosity is unaffected by the process.

To ensure handleability, the pre-consolidated pre-form should be substantially unsticky, i.e. it should be easily releasable from any relevant surface and it should not leave excessive amounts of resin on a surface when released.

To ensure a long shelf life and/or stability during transportation it is important that the curing reaction of the bulk of the resin is sufficiently low at room temperature and that a catalyst—if present—is not activated by accident. For example, if the catalyst is activated by heating, it should be ensured that the activation temperature is considerably higher than the expected maximum temperature during storage.

One of the features of the pre-consolidated pre-forms is that they are at least partially deformable. This may for example be realised through the balanced and limited curing during the pre-consolidation process. In a preferred embodiment, at least a part of a pre-consolidated pre-form is capable of being bent around an axis parallel to the main fibre orientation with a diameter of more than 1 cm, however, in some cases a pre-consolidated pre-form may be bent with a diameter of more than 5 cm by plastic deformation. The low bending diameters may be realised by rearranging of resin and/or fibres or by three-dimensional forming of a pre-form. By three-dimensional forming is herein meant that the thickness (e.g. the number of layers or amount of fibres and/or resin) and/or the form of the ground plan is adjusted for a part of the pre-form relative to the bulk of the pre-form. Typically, only a part of the pre-consolidated pre-form is prepared for very sharp bending, whereas bending around an axis with larger diameters, e.g. 50 cm, may often be realised by all parts of the pre-consolidated pre-form.

The stiffness of a pre-form realised during a pre-consolidation process should ensure that the pre-consolidated pre-form is stiff enough to prevent relaxation of the pre-consolidated pre-form in the length direction of the fibres when placed on a non-flat surface and yet allow for plastic deformation around an axis parallel to the length direction of the fibres. In particular, when a pre-consolidated pre-form comprising carbon fibres is placed on crossing layers of glass fibres or glass fibre pre-pregs with partial overlay, then the pre-consolidated pre-form should remain substantially flat during laying and curing, whereas the glass fibres should adjust to the shape/form of the pre-consolidated pre-form. Hence, the carbon fibres will remain straight leading to increased strength of the combined structure.

The pre-consolidation process often leads to an increase in viscosity of the resin in the pre-form, for example by a partial curing. It is preferred that the viscosity at room temperature is increased by a factor of at least two and more preferably by a factor of at least five, as an increase in viscosity will enhance handleability, strength and unstickyness. In some cases, the viscosity may be increased by a much higher factor like for example 10, 100 or 1000. This is for example the case if part of the resin is injected into the pre-form as a room temperature liquid. Another way to express the increase in viscosity is to look at viscosity directly. It is preferred that the viscosity of the resin in the unconsolidated pre-form is between about 100 to 10,000 cP at the temperature where the pre-consolidation process is conducted, preferably between about 500 to 3,000 cP.

The temperature where the pre-consolidation process is conducted may vary considerably depending particularly on the composition of the resin. Typically, the pre-consolidation temperatures for epoxy-based resin systems are 50 to 90° C. and preferably 60 to 80° C., however, both higher and lower temperatures may be feasible in some systems.

The pre-consolidation process may lead to an increase in the glass transition temperature, $T_g$, of the resin, for example by a partial curing. It is preferred that the $T_g$ of the resin is increased during pre-consolidation by at least 2° C. and preferably by at least 5° C., as an increase in $T_g$ usually indicates an increase in the average molecular weight of the resin, which will enhance handleability, strength and unstickyness. In some cases, $T_g$ may be increased more. This is particularly the case when $T_g$ of the unconsolidated pre-form is very low.

Generally speaking, a pre-consolidated pre-form according to the invention with an epoxy-based resin system should typically have a $T_g$ between −10 to +30° C. and preferably a $T_g$ between −5 to 10° C. In a preferred embodiment, $T_g$ of the resin of the pre-consolidated pre-form is higher than about 0° C. and preferably higher than about 3° C. For the unconsolidated pre-form $T_g$ of the resin should be below about 5° C. and preferably below about 2° C.

In some cases, curing of a pre-consolidated pre-form without being exposed to a vacuum will result in a material with properties equivalent to a vacuum-cured pre-form, since porosity has been eliminated or greatly reduced during the pre-consolidation process prior to the curing.

The resin may comprise more than one system, for example the resin may comprise two systems. These systems may be any combination of different or the same type of systems, however, it is preferred that the resin comprises two substantially epoxy-based systems. The systems of a resin should be compatible. In a preferred embodiment, two epoxy-based systems comprise a common component. The common component may for example be a common catalyst, a common amine component or a common epoxy component, however, it is preferred that the common component is an epoxy component. A resin comprising two epoxy-based systems with a common epoxy component may comprise an amine component of a first epoxy-based system that will react to the common epoxy component at a first relatively low temperature like for example below 50° C., preferably about room temperature. At this first temperature, a second epoxy-based system is preferably non-reactive or the reaction takes place at a very low rate. Since the reaction rate of the second epoxy-based system should be very low, it may advantageously be catalysed by a catalyst, which is un-active until activated. This activation may for example be by UV-light, addition of a compound or by heating, however, it is preferred that the catalyst is activated by heating.

In a preferred method of pre-consolidating a pre-form, a pre-form is placed on a reactor surface like for example a plate, a mould, etc. It is preferred that the reactor surface is flat and that it will withstand heating and/or vacuum. Then a pressure is applied to the pre-form. The pressure may be applied by a press or—preferably—a vacuum within a vacuum enclosure. If a vacuum is used, then a vacuum enclosure should be obtained prior to pressing. The vacuum enclosure may for example comprise a vacuum bag or it may comprise a reactor surface and a flexible cover connected in a vacuum-tight way to the reactor surface. Gas may for example be evacuated through the reactor surface or through an opening in the vacuum bag or flexible cover. The pre-consolidation is activated. The activation may take place before and/or during and/or after applying of pressure. The activation comprises a reduction of the viscosity of the resin. This may for example be realised by physical means (e.g. heating, addition of solvent, pressure etc.) and/or by a chemical reaction. During the pre-consolidation process, a limited curing may or may not take place. When the porosity has been reduced to a desired level or another object of the pre-consolidation is obtained, the pre-consolidation process is terminated. The termination may for example be a result of exhaustion of a first resin system or cooling of the pre-consolidated pre-form to a temperature, where the curing reaction is sufficiently slow and/or the viscosity is sufficiently low for the pre-consolidated pre-form to achieve the stability needed for the desired shelf life.

In a preferred embodiment, the pre-form to be pre-consolidated is having at least one non-continuous layer of resin, through which gas may be removed during the pre-consolidation process. Hence, the gas need not be removed from the pre-form in a plane of a layer of resin or in a plane of a layer of fibres. The transportation distance and risk of having trapped gas inside the pre-consolidated pre-form is greatly reduced. In a more preferred embodiment, all layers of resin—optionally except from a layer on op of the top layer of fibres or below the bottom layer of fibres—are non-continuous.

An example of a method for securing that gas may continuously be removed from the pre-form during pre-consolidation involves a gradual activation of the pre-consolidation process starting either from the centre of the pre-form and moving towards the surfaces or from a side or edge and moving through the pre-form. For example this may be realised by heating from the reaction surface only, hence activating gradually from the side of the pre-form in contact with the reaction surface or by controlled microwave heating, hence activating gradually from the inside of the pre-form and moving towards the surfaces.

Pre-forms according to the invention and provided by a method according to the invention are very useful for preparation of composite members by curing. Particularly, the pre-forms are highly useful for preparation of members for wind turbine blades and particularly in spars in a wind turbine blade, since these composites fulfil the quality requirements and reproducibility requirements.

When larger structures comprising pre-forms according to the invention or pre-forms produced by a method according to the invention are to be prepared, this may follow a method wherein the pre-form is shaped at least partially plastically. The pre-form may be connected to one or more further pre-consolidated pre-forms and/or unconsolidated pre-forms before or after shaping to provide a larger structure. The pre-form may also be connected to other structures. It is preferred but not required that the connections involve a tapered part or layers comprising a second type of fibres. The combined structure may be placed in a vacuum enclosure and provided with vacuum prior to curing. Finally, the pre-form structure is cured.

The properties of a laminar structure having layers of oriented fibres depend to a large extent on the distribution of the main elements of the structure resin, fibres and porosity. The resin possesses a low strength compared to the fibres and may hence provide a route for crack propagation through the structure, if too large layers of resin are present. Porosity may reduce the strength of the structure dramatically but the adversity depends on the size of pores, the shape and the distribution, i.e. the effect of small, isolated spherical pores is limited, whereas larger pores positioned in the interface between resin and fibres may be fatal to the structure. It is hence vital to be able to control the distribution of the elements.

The extent of redistribution depends i.a. on the viscosity of the resin during the compaction process, i.e. the lower the viscosity, the easier the redistribution of the elements. By utilising a pre-consolidation process the viscosity of the resin may be lowered more than what is feasible in the prior art, since the structure is not limited to support a particular shape during the process. When the pre-consolidation involves a limited curing of the resin, the viscosity may be further reduced since the curing increases the handleability and reduces the sticking of the pre-consolidated pre-form. Hence, pre-consolidation allows for redistribution of resin and/or fibres to a much greater extent than what may be realised in the prior art. The resulting pre-consolidated pre-forms may possess very low porosity as well as a more homogeneous structure. This may for example result in a composite structure having a less pronounced laminar structure, i.e. where the layers are less pronounced than a corresponding composite structure comprising only pre-forms that were not pre-consolidated prior to curing.

TABLE FOR IDENTIFICATION

| | |
|---|---|
| 2 | Fibres indicating a main fibre orientation |
| 4 | Resin |
| 4a | Line of resin |
| 4b | Dots or particles of resin |
| 4c | Random line of resin |
| 4d | Sheet of resin |
| 6 | Adhesive |
| 6a | Adhesive near fibre initiation |
| 6b | Adhesive near fibre termination |
| 6c | Adhesive on central part of pre-form |
| 6d | Adhesive on central part of pre-form in zigzag pattern |
| 10 | Ground plan of pre-form |
| 12 | Through-going hole |
| 14 | Direction of fibre laying |
| Y | Angle between edges of a ground plan of pre-form |
| α | Angle between edges of a ground plan of pre-form |
| β | Angle between edges of a ground plan of pre-form |
| 20 | Tapered part of pre-form in the main direction of the fibres |
| 22 | Tapered part of pre-form orthogonal to main direction of the fibres |
| 24 | Un-tapered part of pre-form |
| 30a | Amine of a first epoxy based system |
| 30b | Amine of a second epoxy based system |
| 32 | Catalyst for a second epoxy based system |
| 34 | Epoxy component |
| 36 | Pre-mix comprising amine component and catalyst |
| 38 | Mix and apply unit |

| | |
|---|---|
| 40 | Mixed and distributed resin |
| 50 | Ground plan of oriented fibres |
| 52 | Part having a low number of layers of fibres |
| 54 | Part having an intermediate number of layers of fibres |
| 56 | Part having a high number of layers of fibres |
| 60 | Fibre layer comprising carbon fibres |
| 62 | Fibre layer comprising second type fibres |
| 64 | Overlay distance of the interlace |
| 66 | Distance between the ends of layers comprising second type fibres |

The invention claimed is:

1. A pre-form comprising a resin, an adhesive, and at least three layers of fibres, wherein:
a plurality of said layers of fibres consist exclusively of unidirectionally oriented, continuous fibre tows,
the resin is consisting essentially of a thermosetting material and contains no thermoplastic materials,
the adhesive is applied in a non-continuous layer between adjacent layers of fibres to at least partially immobilize the fibres and to define a plurality of gas escape pathways having pathway outlets directed in at least two orthogonal directions, the at least two orthogonal directions being transverse to the longitudinal orientation of the fibre tows such that the at least two orthogonal directions include a primary orthogonal direction oriented through a thickness defined by the plurality of said layers of fibres in combination and a secondary orthogonal direction oriented parallel to the plurality of said layers of fibres, and such that the gas escape pathways promote gas escape during curing or pre-curing of the resin and adhesive in the at least two orthogonal directions through the pathway outlets, and
a part of said pre-form being formed three-dimensionally so that said part of said pre-form is tapered.

2. The pre-form of claim 1, wherein the fibres are continuous fibres.

3. The pre-form of claim 1, wherein the resin is mainly an epoxy-based resin or a polyester-based resin.

4. The pre-form of claim 3, wherein the resin comprises two resin systems.

5. The pre-form of claim 1, wherein the pre-form is substantially rectangular in shape as observed in plan view from above.

6. The pre-form of claim 5, wherein the rectangular shape of said pre-form defines a distance between parallel sides of the rectangular shape that is between at least 3 times and 6 times the length of any of the parallel sides.

7. The pre-form of claim 1, wherein the pre-form is substantially trapezoidal in shape when in plan view as viewed from above.

8. The pre-form of claim 7, wherein the trapezoidal shape of said pre-form trapezoid has at least two interior angles ($\alpha,\beta$) which are substantially the same.

9. The pre-form of claim 1, wherein the pre-form is substantially quadrangular or triangular in shape in plan view as observed from above.

10. The pre-form of claim 1, wherein the fibres are oriented substantially orthogonally to an edge of the pre-form.

11. The pre-form of claim 1, wherein the fibres are oriented substantially parallel to an edge of the pre-form.

12. The pre-form of claim 1, wherein fibres are oriented to strengthen areas of the final element which will be exposed to higher stress during service.

13. The pre-form of claim 1, wherein orientation of fibres is substantially the same in all layers.

14. The pre-form of claim 1, wherein orientation of fibres in a first layer is different from the orientation of fibres in a second layer.

15. The pre-form of claim 1,
wherein a part of said pre-form is tapered along a connection surface defined by terminal ends of said layers of fibres that comprise first type fibres,
wherein said layers of fibers in the pre-form comprise said first type fibres and second type fibres provided in layers having an appreciable amount of, or exclusively containing said second type fibres interlaced between layers having an appreciable amount of, or exclusively containing said first type fibres, the layers containing second type fibres being separated from one another by the layers containing first type fibres, the second type fibres extending beyond said connection surface of the pre-form, and
wherein said second type fibres do not contain the same fibre material as the first type fibres such that the pre-form is enhanced for coupling at the connection surface to a composite member comprising the second type fibres and a resin, said second type fibres positioned to extend into said pre-form on one side of said connection surface and extend into the composite member comprising said second type fibres on another side of said connection surface.

16. The pre-form of claim 15, wherein the first type fibres include carbon fibres, the second type fibres are not carbon fibres, and the second type fibres are selected from the group of glass fibres, aramid-fibres, synthetic fibres, bio fibres, mineral fibres, metal fibres or boron fibres.

17. A pre-form comprising a resin, an adhesive, and at least three layers of fibres, wherein:
a plurality of said layers of fibres include continuous oriented fibre tows defining a lengthwise orientation, and
the adhesive is applied in a pattern between adjacent layers of fibres to at least partially immobilize the fibres and to define an adhesive layer between the adjacent layers of fibres, the adhesive layer including a plurality of gas escape pathways having pathway outlets directed in an orthogonal direction, the orthogonal direction being transverse to the lengthwise orientation of the fibre tows and within the adhesive layer, such that the gas escape pathways promote gas escape during curing or pre-curing of the resin and adhesive in the orthogonal direction through the pathway outlets without requiring the gas to move through the adjacent layers of fibers to escape.

18. The pre-form of claim 17, wherein the fibres of each layer are oriented primarily unidirectionally, respectively.

19. The pre-form of claim 17, wherein the adhesive forms a non-continuous layer between adjacent layers of fibres.

20. The pre-form of claim 17, wherein the resin consists essentially of a thermosetting material and contains no thermoplastic materials.

* * * * *